(12) United States Patent
Velthaus et al.

(10) Patent No.: US 10,216,014 B2
(45) Date of Patent: Feb. 26, 2019

(54) ELECTRICAL LINE ARRANGEMENT

(71) Applicant: FRAUNHOFER-GESELLSCHAFT ZUR FÖRDERUNG DER ANGEWANDTEN FORSCHUNG E.V., München (DE)

(72) Inventors: Karl-Otto Velthaus, Kleinmachnow (DE); Marko Rausch, Berlin (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 15/039,399

(22) PCT Filed: Nov. 25, 2014

(86) PCT No.: PCT/EP2014/075527
§ 371 (c)(1),
(2) Date: May 25, 2016

(87) PCT Pub. No.: WO2015/075259
PCT Pub. Date: May 28, 2015

(65) Prior Publication Data
US 2016/0349541 A1   Dec. 1, 2016

(30) Foreign Application Priority Data

Nov. 25, 2013 (EP) ..................... 13194258

(51) Int. Cl.
*G02F 1/225* (2006.01)
*G02F 1/01* (2006.01)

(52) U.S. Cl.
CPC ............ *G02F 1/0121* (2013.01); *G02F 1/011* (2013.01); *G02F 1/2255* (2013.01); *G02F 2201/127* (2013.01)

(58) Field of Classification Search
CPC ...... G02F 1/0121; G02F 1/011; G02F 1/2255; G02F 2201/127
(Continued)

(56) References Cited

U.S. PATENT DOCUMENTS 6,381,379 B1 * 4/2002 Burns .................. G02F 1/2255
359/238
6,567,203 B1    5/2003 Hill et al.
(Continued)

FOREIGN PATENT DOCUMENTS

EP    2 116 889 A1   11/2009
EP    2 615 489 A1    7/2013
(Continued)

OTHER PUBLICATIONS

Bogatin, E., "Differential Impedance . . . finally made simple", Training for Signal Integrity and Interconnect Design, 2000, pp. 1-25.
(Continued)

*Primary Examiner* — Jerry Blevins
(74) *Attorney, Agent, or Firm* — Maschoff Brennan

(57) ABSTRACT

An electrical line arrangement, comprising a first and a second electrical line forming a coplanar strip line and at least one terminating resistor terminating the first and the second electrical line, is provided. In a first region of the electrical line arrangement the first and the second electrical line extend in a first distance from one another and in a second region of the electrical line arrangement the first and the second electrical line extend in a second distance from one another that is larger than the first distance. The terminating resistor is physically arranged at a position between the first and the second electrical line in the second region of the electrical line arrangement. At least one electrically conductive structure is arranged between the first and the
(Continued)

second electrical line at least partially in the second region of the electrical line arrangement.

19 Claims, 7 Drawing Sheets

(58) Field of Classification Search
USPC .......................................................... 385/3
See application file for complete search history.

(56) References Cited

U.S. PATENT DOCUMENTS

2004/0066549 A1     4/2004   Kiehne et al.
2006/0228065 A1* 10/2006   Burns ................... G02F 1/0356
                                                              385/3

FOREIGN PATENT DOCUMENTS

| EP | 2 615 490 A1 | 7/2013 | |
| JP | 2002-333604 A | 11/2002 | |
| JP | 2002333604 A * | 11/2002 | ............ G02F 1/035 |
| JP | 2010-211060 A | 9/2010 | |
| WO | 2013/096750 A1 | 6/2013 | |
| WO | 2013/123294 A2 | 8/2013 | |

OTHER PUBLICATIONS

Chou, H.F., et al., "Standing-Wave Enhanced Electroabsorption Modulator for 40-GHz Optical Pulse Generation", IEEE Photonics Technology Letters, vol. 15, Issue 2, Feb. 2003, pp. 215-217.

Hoffmann, D., et al., "45 GHZ Bandwith Travelling Wave Electrode Mach-zehnder Modulator with Integrated Spot Size Converter", Proceedings International Conference on Indium Phosphide and Related Materials, 2004, pp. 585-588.

Simons, R. N., et al.,"Modeling of Coplanar Stripline Discontinuities", IEEE Transactions on Microwave Theory and Techniques, vol. 44, Issue 5, May, 1996, pp. 711-716.

Walker, R. G., "High-Speed III-V Semiconductor Intensity Modulators", IEEE Journal of Quantum Electronics, vol. 27, Issue 3, Mar. 1991, pp. 654-667.

* cited by examiner

ELECTRICAL LINE ARRANGEMENT

CROSS-REFERENCE TO A RELATED APPLICATION

This application is a National Phase Patent Application of International Patent Application Number PCT/EP2014/075527, filed on Nov. 25, 2014, which claims priority of European Patent Application Number 13194258.3, filed on Nov. 25, 2013.

BACKGROUND

The invention relates to an electrical line arrangement.

For example, such electrical line arrangements are used as high frequency electrode arrangements of electro-optical modulators, wherein the electrode arrangements are used to supply a voltage across optical waveguides of the modulators for creating a phase shift of the optical waves propagating in the waveguides. For example, travelling wave electrodes are used for supplying a voltage to the optical modulator waveguides as disclosed in the publication "High-Speed III-V Semiconductor Intensity Modulators", Robert G. Walker, IEEE Journal of Quantum Electronics Vol. 27, No. 3, March 1991.

The impedance of such (broadband) electrode arrangements needs to be adapted to the impedance of a driver unit that is used to supply a high frequency voltage to the travelling wave electrodes. In particular, the travelling wave electrodes are terminated using a terminating resistor for avoiding reflections at the end of the electrodes. In order to provide a terminating resistor that is sufficiently temperature resistant, the terminating resistor will need to have a certain size. This in turn requires that the gap between the travelling wave electrodes enlarges at the end of the electrodes in order to provide space for the terminating resistor. The larger gap at the end of the electrodes, however, may deteriorate the impedance matching of the travelling wave electrodes.

SUMMARY

It is an object of the invention to provide a terminated electrical line arrangement allowing more precise impedance matching, in particular over a broad frequency range.

According to the invention, an electrical line arrangement is provided, comprising
a first and a second electrical line forming a coplanar strip line;
at least one terminating resistor terminating the first and the second electrical line,
wherein in a first region of the electrical line arrangement the first and the second electrical line extend in a first distance from one another and wherein in the second region of the electrical line arrangement the first and the second electrical line extend in a second distance from one another that is larger than the first distance,
and wherein the terminating resistor (which may be ohmic and impedance matched to the electrical line arrangement) is arranged between the first and the second electrical line in the second region of the electrical line arrangement, wherein
at least one electrically conductive structure is arranged between the first and the second electrical line at least partially in the second region of the electrical line arrangement for adapting the impedance of the coplanar strip line.

The conductive structure arranged between the first and a second electrical line in particular will influence the effective distance of the first and a second electrical line, i.e. the distance between the first and a second electrical line that determines the impedance of the coplanar strip line. For example, the geometry of the electrically conductive structure is chosen in such a way that the effective distance of the widened second region of the electrical line arrangement and thus the impedance of the whole coplanar strip line at least essentially equals the impedance of a straight coplanar strip line, i.e. a coplanar strip line whose first and second electrode are disposed in the first distance from one another over the entire length of the strip line.

In particular, the conductive structure is arranged and configured in such a way that it at least essentially matches the impedance of the first region to the impedance of the second region of the electrical line arrangement.

For example, the conductive structure is galvanically isolated from the first and the second electrical line and the terminating resistor. However, when the first and the second electrical line is driven symmetrically, i.e. when a differential voltage is supplied to the electrical line arrangement, a DC potential may be supplied to the conductive structure, e.g. the same potential supplied to the terminating resistor(s), wherein the conductive structure is an electrically "floating" structure whose DC potential may be altered, which, however, is not affected by the alternating voltage (e.g. a high frequency voltage) supplied to the coplanar strip line. In particular, the electrically conductive structure may be located in the (electrical) symmetry plane of the coplanar strip line such that the conductive structure will not influence a signal transmitted via the coplanar strip line. Accordingly, the first and the second electrical line may also be formed as geometrically symmetric structures. Also, the electrical line arrangement according to the invention may comprise a driver unit (i.e. an amplifier) supplying the differential voltage signal to the coplanar strip line.

According to another embodiment of the invention, a single terminating resistor (having a resistance of e.g. 50 Ohm) is arranged between the first and a second electrical line in the second region of the electrical line arrangement. The terminating resistor thus is connected to an ending of the first electrical line and to an ending of the second electrical line, wherein the electrically conductive structure may be electrically isolated from the terminating resistor and the first and the second electrical line. The electrical isolation may be provided by a sufficient gap between the electrically conductive structure and the terminating resistor and the electrical lines, respectively, wherein the gap may be filled with an isolating material and/or the conductive structure may be arranged on an isolating material. However, the electrical isolation of the conductive structure is only optional as set forth above.

The terminating resistor may be formed by a material layer (e.g. a thin film layer or a thin film layer packet) arranged in particular on the same substrate as the first and the second electrical line.

The electrical line arrangement according to the invention may also comprise two terminating resistors arranged between the first and a second electrical line in the second region of the electrical line arrangement, wherein the two terminating resistors are connected to one another via an end contact. In particular, a first end of the first one of the terminating resistors is connected to the first electrical line and a second end is connected to the end contact. Similarly, a first end of the second terminating resistor is connected to the second electrical line and a second end is connected to the end contact. The two terminating resistors may be formed by material layers connected to one another by an end contact layer forming the end contact. For example, the terminating resistors have the same resistance (e.g. 25 Ohm each), in particular for realizing the symmetric operation of the coplanar strip line as discussed above. However, the terminating resistors may have different resistances, in particular if they are not connected to one another.

The end contact may be used to supply a DC voltage to the first and the second electrode. It is also conceivable that the conductive structure is connected to the end contact such that the DC voltage is supplied to the conductive structure as well. Such an arrangement may be used in an open collector circuit as explained in more detail below.

According to a further embodiment, the conductive structure is part of a capacitive structure which capacitively couples, but galvanically separates the two terminating resistors. For example, the conductive structure comprises conductive elements (e.g. conductive layers) of the capacitive structure. Such an arrangement may be employed in another open collector circuit as also explained in more detail below.

For example, the conductive structure comprises two electrically conductive layers (of the capacitive structure) separated by a dielectric layer (which also belongs to the capacitive structure), wherein a first one of the conductive layers is connected to a first one of the terminating resistors and a second one of the conductive layers is connected to a second one of the terminating resistors.

It is also possible that each one of the terminating resistors shall be capacitively coupled to ground. This may be realized by a conductive structure that comprises three electrically conductive layers and two dielectric layers, wherein a first one of the dielectric layers is arranged between a first and a second one of the conductive layers and a second one of the dielectric layers is arranged between the second and a third one of the conductive layers, and wherein the first conductive layer is connected to the first terminating resistor, the third conductive layer is connected to the second terminating resistor and the second conductive layer is grounded.

The first and the second electrical line may further be capacitively coupled to one another, i.e. a capacitor or a plurality of capacitors may be provided via which the first electrical line is coupled to the second electrical line.

The terminating resistor further may be arranged on the same substrate as the first and the second electrical line of the electrical line arrangement. Moreover, the distance between the first and the second electrical line in the first region of the electrical line arrangement is at least essentially constant.

The invention further relates to an electro-optical modulator that comprises at least one optical waveguide and an electrical line arrangement as described above, wherein the electrical line arrangement forms an electrode arrangement for applying a voltage across the optical waveguide. The modulator in particular is a travelling wave Mach-Zehnder modulator. An example of a possible principal optical and electrical layout of such an Mach-Zehnder modulator is described in the publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004, wherein the content of this article in respect to the optical and electrical design of the Mach-Zehnder modulator is incorporated by reference herewith. It is noted that such a modulator may also be operated as a phase modulator, wherein only one of the two optical waveguides of the modulator is used to modulate the phase of an optical signal. For example, the one of the optical waveguides that is not used may be optically inactive, wherein, however, capacitive segments formed by the optically inactive waveguide are used for capacitively coupling of waveguide electrodes arranged on top of the optically active waveguide to the driver unit.

It is noted, however, that the invention is of course not restricted to a particular electrode design but could be also used in other electrical circuits or to form other electrical circuits.

According to another embodiment of the invention, the driver unit is operated in open collector mode or in open collector mode with back termination. Similarly, the driver unit may be operated in open drain or in open drain mode with back termination (if the driver unit is a CMOS device).

It is noted that it is of course not necessary to use open collector circuitry. Rather, the driver unit may have an internal terminating resistance that equals the impedance of the electrode arrangement, wherein the impedance of the first and the second electrical line and other electrical components (such as the terminating resistor mentioned above) is matched to the internal terminating resistance of the driver unit.

Further, the driver unit may supply a differential voltage to the coplanar strip line of the modulator as also already mentioned above. Examples of symmetrically driven modulator electrodes are disclosed in the European patent applications EP 2 615 489 and EP 2 615 490 which in that respect are enclosed by reference herewith.

The electrical line arrangement according to the invention may be realized using indium phosphide technology, i.e. components of the electrical line arrangement are arranged on an indium phosphide substrate. However, of course the electrical line arrangement can be fabricating using other technologies, i.e. substrates and semiconductor layers based on other materials such as gallium arsenide or silicon.

BRIEF DESCRIPTION OF THE DRAWINGS

Embodiments of the invention are explained in more detail hereinafter with reference to the Drawings.

DETAILED DESCRIPTION

Figure 1:
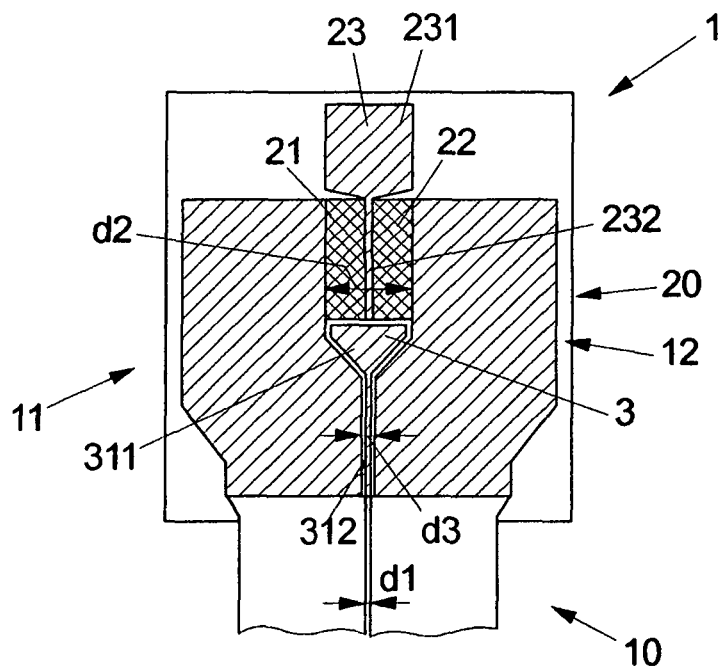
FIG. 1 shows a top view of a detail of an electrical line arrangement according to a first embodiment of the invention.

FIG. 1 illustrates a detail of an electrical line arrangement according to an embodiment of the invention, the electrical line arrangement being forming an electrode arrangement 1 of an electro-optic travelling wave modulator. The electrode arrangement 1 comprises a first and a second electrical line 11, 12 forming a coplanar strip line. The coplanar strip line formed by the electrical lines 11, 12 is used to apply a voltage across two optical waveguides (not visible in FIG. 1) of the modulator.

In order to terminate the coplanar strip line two terminating resistors 21, 22 (each one having a resistance of e.g. 25Ω) are arranged between the electrical lines 11, 12, wherein the terminating resistors 21, 22 are formed as material layers arranged on a substrate together with the coplanar strip line, i.e. the terminating resistors 21, 22 are monolithically integrated with other components the electro-optic modulator. However, as mentioned above it is of course also possible that the terminating resistors 21, 22 are not monolithically integrated with the modulator. For example, the resistors 21, 22 are arranged on a different substrate and are bonded to the electrical lines 11, 12 (e.g. by means of bonding wires).

In order to permit the two terminating resistors 21, 22 to be arranged between the electrical lines 11, 12, the gap between the electrical lines 11, 12 widens towards the terminating resistors 21, 22 such that the electrode arrangement 1 comprises a first section 10 in which the electrical lines 11, 12 extend with a first distance $d_1$ from one another and a second region 20 in which the electrical lines 21, 22 extend with a second distance $d_2$ from one another, wherein the second distance $d_2$ is larger than the first distance $d_1$.

In the second region 20, an electrically conductive structure in the form of an additional metal layer 3 is arranged which compensates the influence of the larger gap between the electrical lines 11, 12 in the second region 20 on the impedance of the coplanar strip line. In particular, the metal layer 3 reduces the effective distance between the first and the second electrical line 11, 12, which determines the impedance of the coplanar strip-line, such that a deteriorating effect of the increased distance between the electrical lines 11, 12 in the region of the terminating resistors 21, 22 may be compensated.

In particular, the dimensions of the metal layer 3 are chosen in such a way that the impedance of the coplanar strip line formed by the electrical lines 11, 12 is adapted to the desired overall impedance of the coplanar line. In particular, the effective distance of the electrical lines 11, 12 from one another varies with the geometry of the metal layer 3 such that the metal layer 3 can be used to adapt the impedance of the coplanar strip line. In particular, instead of a single metal layer 3 a plurality of layers (comprising e.g. more than one metal layer as shown in FIGS. 5A-C and FIG. 6, metal structure 31).

More particularly, the metal layer 3 comprises a triangular base portion 311 integrally connected to a longitudinal protrusion 312. The triangular portion 311 extends within a lower subregion of the second region 20 (with distance $d_2$ between the electrical lines 11, 12) of the electrode arrangement 1, but also extends towards the first region 10, i.e. it extends within a region of the electrode arrangement 1 where the gap between the electrical lines 11, 12 decreases from distance $d_2$ towards a third distance $d_3$ that is smaller than $d_2$ and larger than $d_1$. The longitudinal portion 312 of the metal layer 3 extends in the region of the third distance $d_3$.

It is noted that the gap between the electrical lines 11, 12 in the first and/or the second region 10, 20 of the electrode arrangement 1 does not necessarily have to be constant. It is further noted that the shape of the gap between the electrical lines 11, 12 shown in FIG. 1 is of course only exemplary. Accordingly, other shapes of the metal layer 3 are conceivable. Accordingly, other shapes of the metal layer 3 are conceivable, e.g. having a rectangular, round and/or a sine shaped base portion 311. Further, the longitudinal portion 312 of the metal layer 3 may be shorter or may even be omitted.

Figure 7:
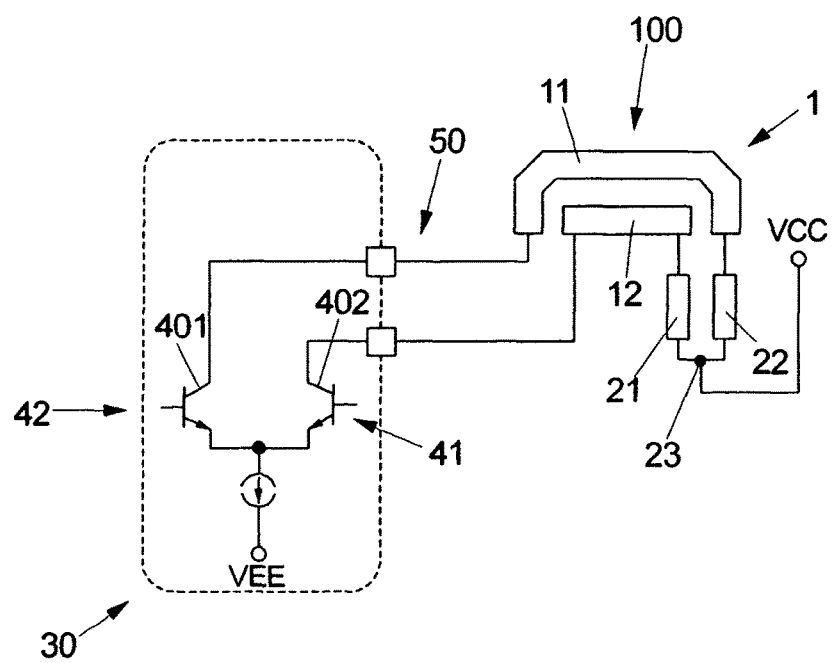
FIG. 7 depicts a circuit diagram of an electrode arrangement of an electro-optic modulator in a first open collector configuration.

Moreover, the terminating resistors 21, 22 are connected to one another via an end contact 23 (in particular formed by a metal layer) that may be used to realize the open collector circuit shown in FIG. 7. That is, the end contact 23 can be used to connect the supply voltage VCC to the electrical lines 11, 12 and thus to feed the supply voltage VCC to the driver unit. More particularly, the end contact 23 has a (rectangular) base portion 231 from which a longitudinal portion 232 extends towards the base portion 311 of the metal layer 3, wherein the terminating resistors 21, 22 are connected to one another via the longitudinal portion 232.

When supplying a differential voltage to the modulator's electrode arrangement 1, i.e. when the electrical lines 11, 12 are driven symmetrically, the longitudinal portion 232 may be connected to the triangular base portion 311 of the metal layer 3 such that the metal layer 3 could be connected to a DC potential together with the terminating resistors 21, 22. It is noted that the metal layer 3 may assume different DC potentials, wherein, however, its potential does not vary with a symmetric alternating voltage applied to the coplanar strip line, i.e. the metal layer 3 is arranged as a "floating" structure.

However, the metal layer 3 can be electrically (galvanically) isolated from the electrical lines 11, 12 and the terminating resistors 21, 22. In particular, the electrical isolation of the metal layer 3 may be realized by a gap between the metal layer 3 and the surrounding portions of the electrical lines 11, 12 and the terminating resistors 21, 22.

Figure 2:
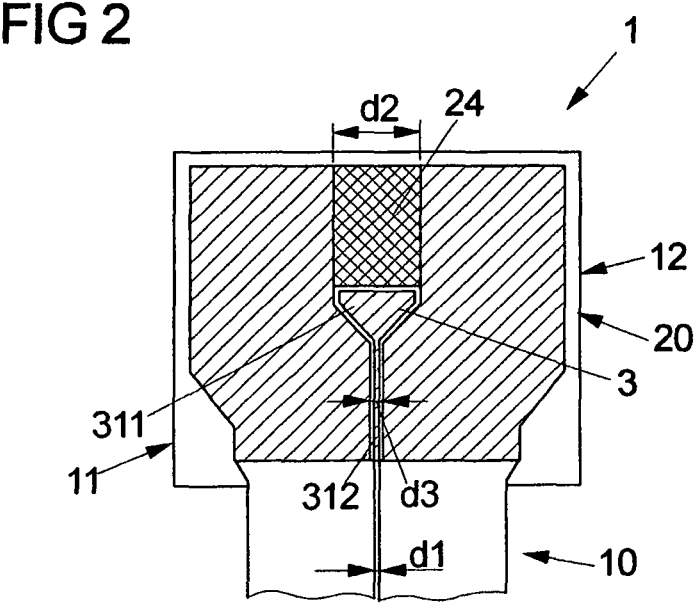
FIG. 2 shows a detail of an electrical line arrangement according to a second embodiment of the invention.

The two terminating resistors 21, 22 might be replaced by a single terminating resistor 24 as shown in FIG. 2. The single terminating resistor 24 is arranged in the second region 20 of the electrode arrangement 1 similarly to the two terminating resistors 21, 22 in FIG. 1. Also, a metal layer 3 is arranged in the second region 20 of the electrode arrangement 1 for adapting the overall impedance of the electrode arrangement 1. Further, the metal layer 3 may be galvanically isolated from the electrical lines 11, 12 and the terminating resistor 24.

Figure 3:
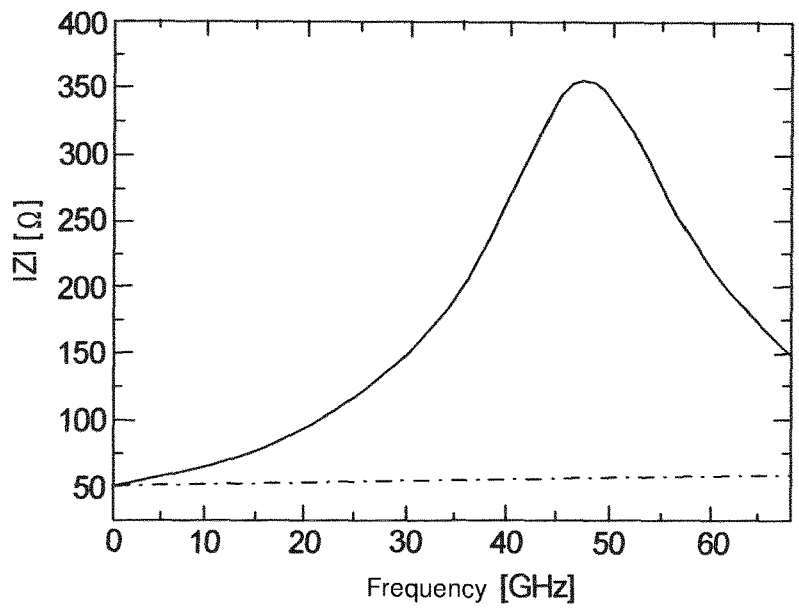
FIG. 3 illustrates the simulated impedance of the electrical line arrangement shown in FIG. 1 relative to a conventional electrical line arrangement.

The effect on the overall impedance of the electrode arrangement of the metal layer 3 is illustrated in FIG. 3, wherein the impedance of an electrode arrangement according to FIG. 1 over the frequency of a voltage supplied to the electrode arrangement is represented by the broken line. The impedance of a conventional electrode design comprising two separate resistors connected to the electrical lines of a similar coplanar strip line but without the additional metal layer between the electrical lines of the coplanar strip line is represented by the continuous line. The impedance of the conventional electrode design shows a clear peak at higher frequencies, wherein the impedance of the electrode arrangement according to the invention is nearly constant over the whole frequency range with only a slight increase towards higher frequencies.

Figure 4:
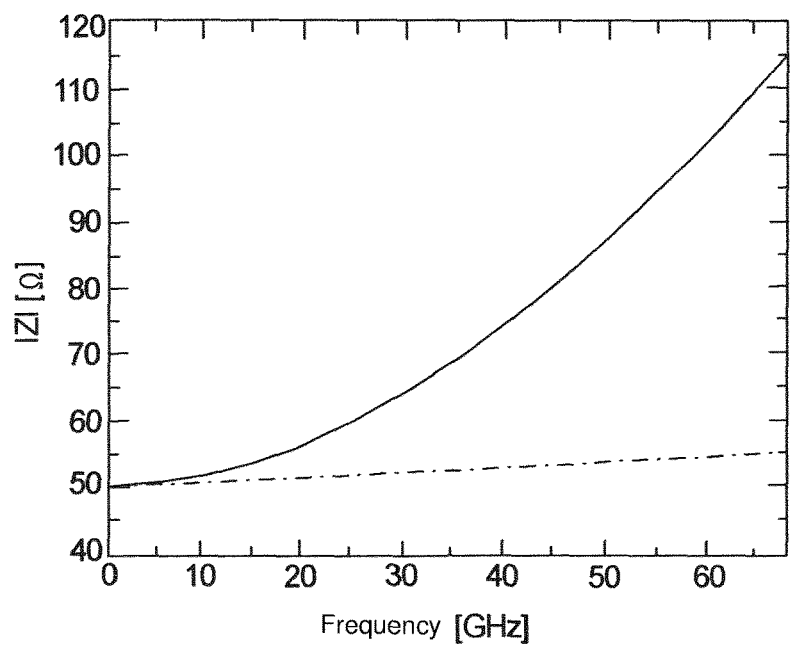
FIG. 4 illustrates the impedance of the electrical line arrangement shown in FIG. 2 relative to a conventional electrical line arrangement.

FIG. 4 shows the frequency behavior of the impedance of the electrode arrangement of FIG. 2 (broken line) relative to the impedance of a conventional electrode arrangement (continuous line), the conventional electrode arrangement having a single terminating resistor but no additional metal layer between the electrical lines of the coplanar strip line. The impedance of the conventional electrode arrangement severely raises towards higher frequencies, wherein the impedance of the electrode arrangement according to the invention only slightly increases.

Figure 5A:
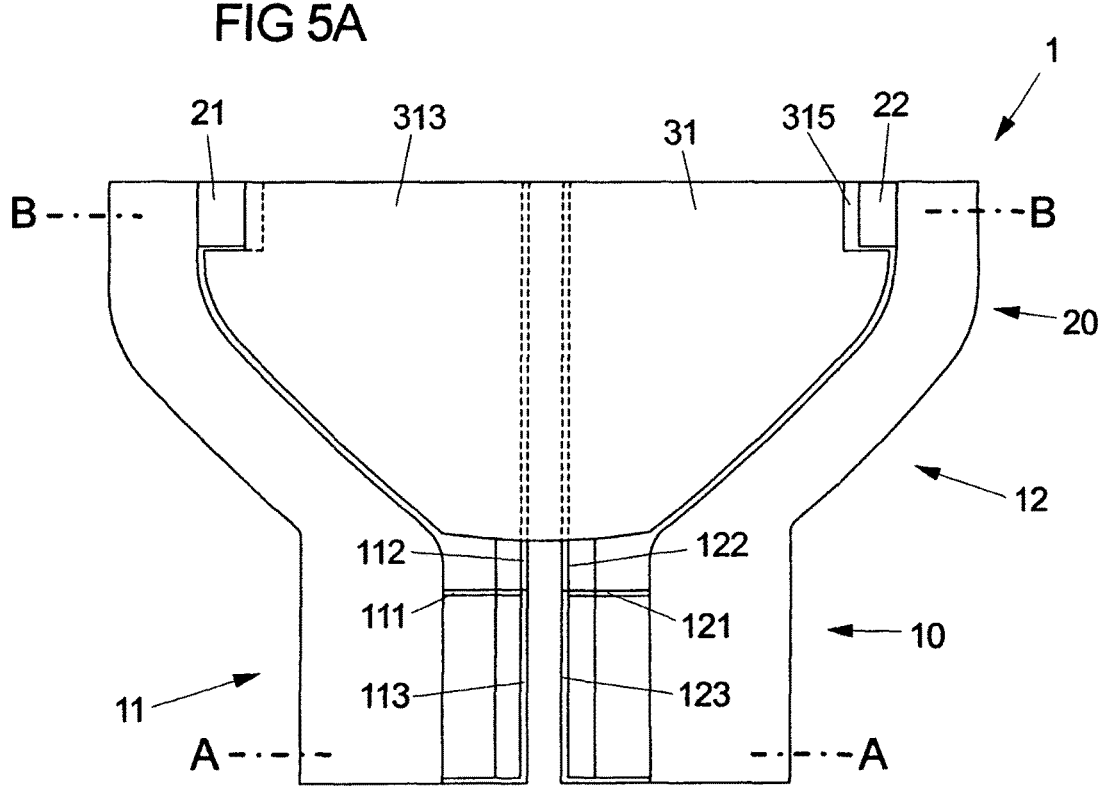
FIG. 5A shows a top view of a detail of an electro-optical modulator comprising an electrical line arrangement according to yet another embodiment of the invention.
Figure 5B:
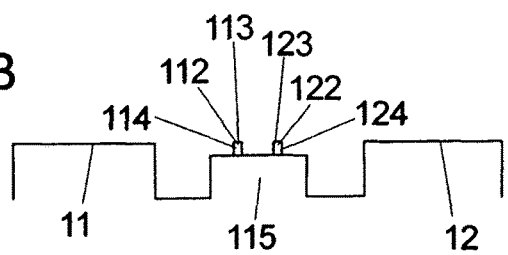
FIG. 5B shows a sectional view of the modulator shown in FIG. 5A along A-A.
Figure 5C:
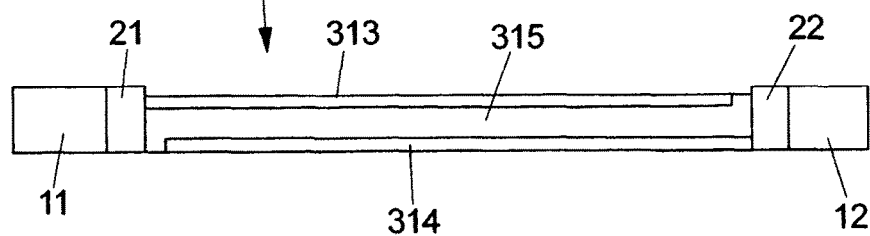
FIG. 5C shows a sectional view of the modulator shown in FIG. 5A through its conductive structure (along line B-B in FIG. 5A).

FIGS. 5A-C relate to another embodiment of an electrode arrangement 1 according to the invention used in an electro-optical modulator. Similar to FIG. 1 the electrode arrangement 1 comprises a first and a second electrical line 11, 12, forming a coplanar strip line. Also, two terminating resistors 21, 22 are provided between the electrical lines 11, 12 in a widened region 20 of the electrode arrangement 1.

The electrical lines 11, 12 are connected via air bridges 111, 121 to waveguide electrodes 113, 123 for applying a voltage across optical wave guides 112, 122 of the modulator as in principle known from the prior art. The first and the second waveguide electrodes 113, 123 are arranged on top of first and second capacitive segments 114, 124 of the optical wave guides 112, 122 such that the first and the second waveguide electrodes 113, 123 and thus the first and second electrical lines 11, 12 are capacitively coupled to one another.

Also, an additional conductive structure in the form of a metal structure 31 is arranged in the second region 20 of the electrode arrangement 1 between the electrical lines 11, 12 for adapting the overall impedance of the electrode arrangement 1. Further, the metal structure 31 forms a capacitive structure that galvanically separates the two terminating resistors 21, 22.

More particularly, the metal structure 31 comprises two metal layers 313, 314 arranged one above the other (see FIG. 5C), wherein the metal layers 313, 314 (e.g. gold layers) are separated by a dielectric layer 315 (e.g. a silicon nitride or a silicon oxide layer) arranged between them. The upper metal layer 313 is electrically connected to the first terminating resistor 21, wherein the lower metal layer 314 is electrically connected to the second terminating resistor 22. Thus, the metal structure 31 provides a capacitor coupling the two terminating resistors 21, 22. In particular, the capacitive coupling between the two terminating resistors 21, 22 provided by the metal structure 31 can be used to realize an open collector circuit shown in FIG. 8.

Figure 6:
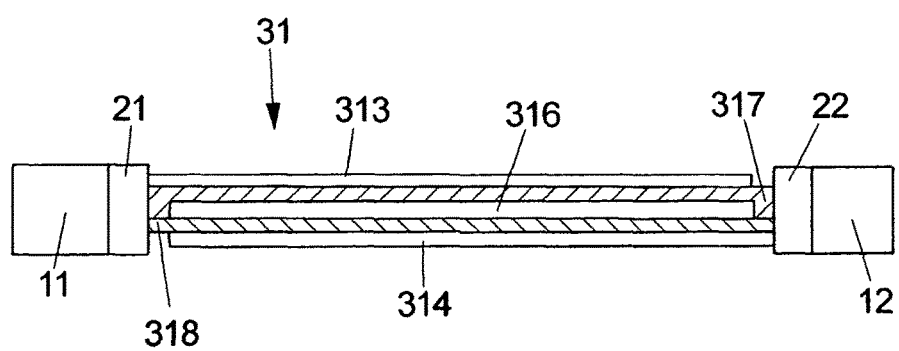
FIG. 6 shows a sectional view of another embodiment of the conductive structure.

FIG. 6 illustrates a second variant of the metal structure 31 (in a sectional view along line B-B in FIG. 5A), the metal structure according to this variant having three metal layers 313, 314 and 316. The first metal layer 313 is galvanically isolated from the third (middle) metal layer 316 by a first dielectric layer 317 and the second metal layer 314 is galvanically isolated from the third metal layer 316 by a second dielectric layer 318, thereby forming a first and a second capacitor. Instead of the two dielectric layers 317, 318 a single dielectric layer embedding the middle metal layer 316 could be arranged.

Figure 9:
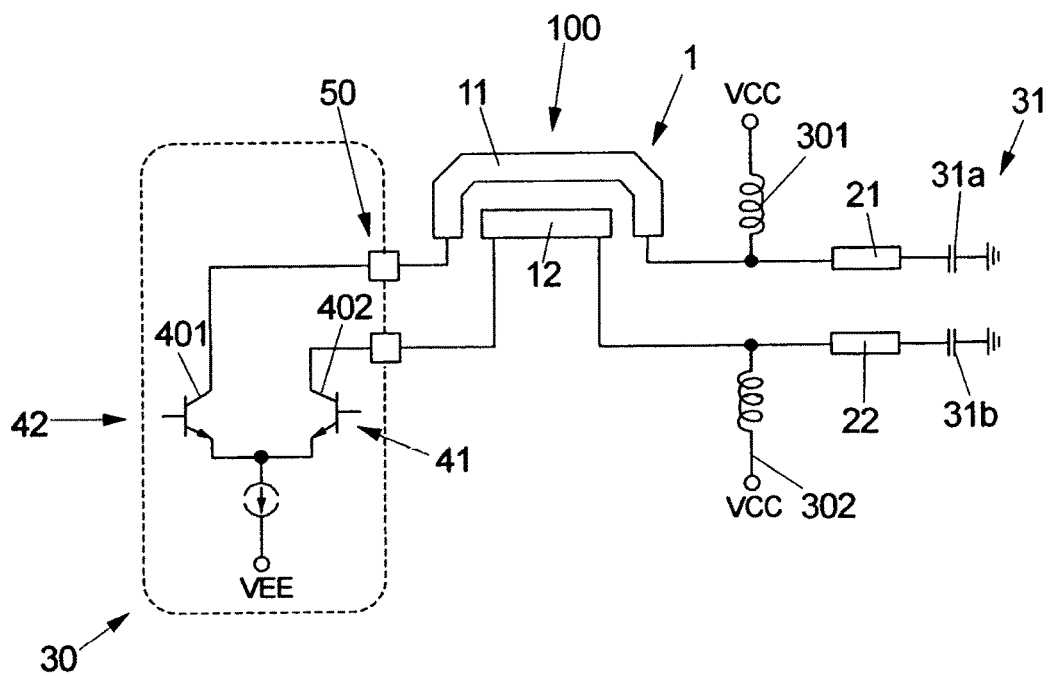
FIG. 9 shows a circuit diagram of an electrode arrangement of an electro-optic modulator in a third open collector configuration.

The middle metal layer 316 will be grounded, wherein the first, upper metal layer 313 is connected to the first terminating resistor 21 and the second, lower metal layer 314 is connected to the second terminating resistor 22 to realize the open collector circuitry shown in FIG. 9. That is, the termination of the coplanar strip line of the modulator is not realized by a single capacitor, but by two capacitors, wherein each one of the terminating resistors 21, 22 is connected to ground via one of the capacitors.

FIG. 7 illustrates a first example of an open collector circuit that may be used to drive the electrode arrangement 1 of the modulator. A driver unit 30 supplies a differential voltage to the modulator's electrode arrangement 1, wherein two terminating resistors 21, 22 are provided for terminating the coplanar strip line of the modulator, wherein the terminating resistors 21, 22 are connected to one another via an end contact 23. The end contact further connects to a supply voltage $V_{CC}$ fed towards the collectors 401, 402 of two transistors 41, 42 of the driver unit 30. The open collector circuit may be realized using the terminating arrangement (terminating network) illustrated in FIG. 1.

Figure 8:
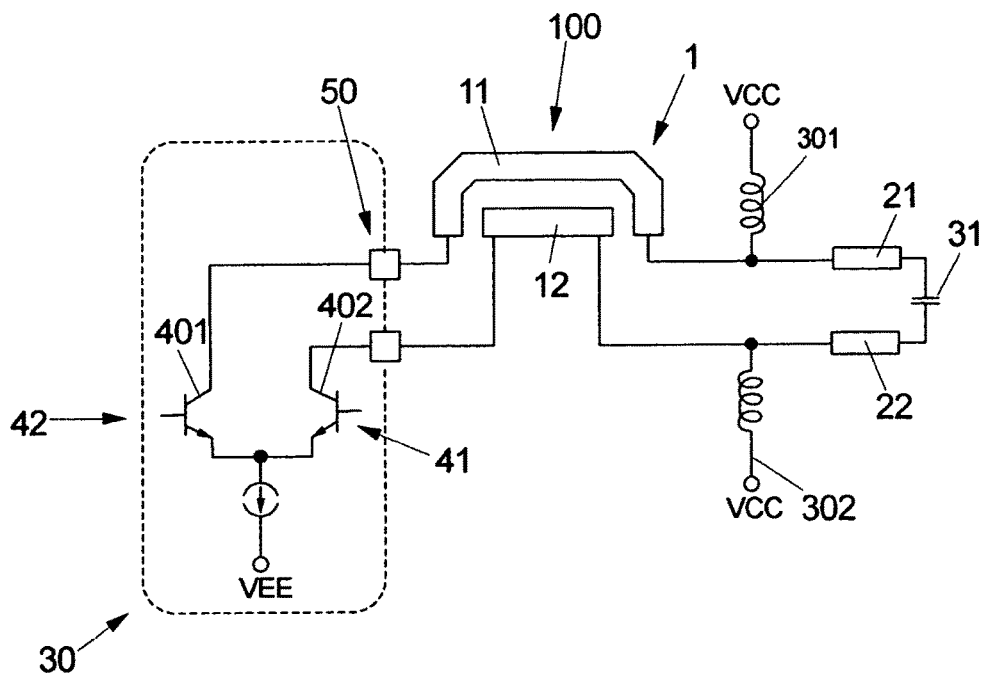
FIG. 8 depicts a circuit diagram of an electrode arrangement of an electro-optic modulator in a second open collector configuration.

According to the embodiment of FIG. 8, the electrode arrangement 1 comprises the two terminating resistors 21, 22 illustrated in FIGS. 5A-C, the terminating resistors 21, 22 being capacitively coupled via the metal structure 31. Further, two inductances 301, 302 are connected to the terminating resistors 21, 22 via which a supply voltage $V_{CC}$ is fed towards the collectors 401, 402 of two transistors 40, 41 of the driver unit 30. Supplying $V_{CC}$ via the inductances 301, 302 has the advantage that the supply power is guided around the terminating resistors 21, 22 such that a power loss in the terminating resistors 21, 22 is avoided. According to another embodiment, the inductances 301, 302 are arranged between the driver unit 30 and the modulator 100.

Further, it is noted that the driver unit 30 may also be a CMOS device, wherein an open drain circuit may be realized (by supplying the voltage $V_{CC}$ to a drain of the driver unit's transistors).

FIG. 9 relates to another open collector circuitry that may be used to operate the electrode arrangement 1 of the modulator, wherein the driver unit 30 again is connected to the electrical lines 11, 12 of the modulator's electrode arrangement 1 via the flexible coplanar strip line 50. Furthermore, the termination of the modulator's coplanar strip line is realized by two terminating resistors 21, 22, each one of the terminating resistors 21, 22 being connected to ground via a capacitor 31a, 31b realized by the metal structure 31 illustrated in FIG. 6.

It is noted that of course other circuits may be realized by the electrical line arrangement according to the invention.

Figure 10:
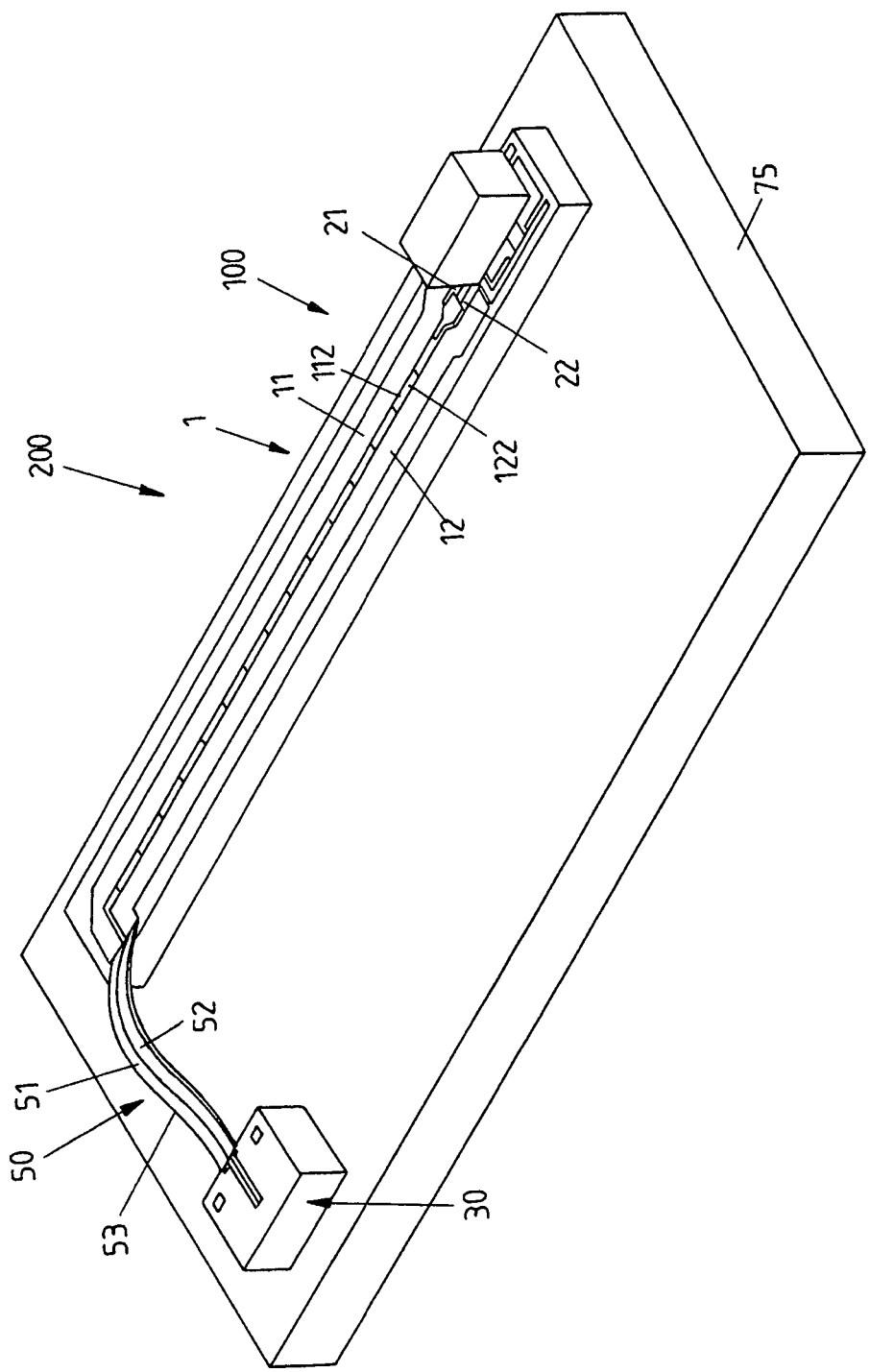
FIG. 10 shows an electro-optic modulator device including a modulator comprising an electrical line arrangement according to the invention.

FIG. 10 shows a perspective view of a complete Mach-Zehnder-modulator device 200 with an electro-optical modulator 100 that comprises an electrode arrangement 1 according to the invention, wherein the electrode arrangement 1 may be the one shown in FIG. 1 or FIGS. 5A to C and 6, respectively. Thus, the electrode arrangement 1 comprises electrical lines 11, 12 forming a coplanar strip line, wherein two terminating resistors 21, 22 and a metal structure 3, 31 are arranged between the electrical lines 11, 12 in a widened portion of the electrode arrangement 1. However, of course also the arrangement shown in FIG. 2 (single terminating resistor) could be employed in modulator 100.

In addition to a capacitor that may be realized by the metal structure 3, 31 a further (optional) capacitor 40 is arranged. The capacitor 40 has a capacitance that is larger than the capacitance provided by the metal structure 3, 31 such that the terminating resistors 21, 22 may be capacitively coupled also with respect to lower frequencies. For example, the further capacitor 40 allows frequencies below 1 GHz to pass, while frequencies above 1 GHz will pass via the capacitor formed by the metal structure 31.

Besides the modulator 100 the electro-optical modulator device 200 further comprises a driver unit 30 configured to supply a (high frequency) differential voltage to the electrode arrangement 1 of modulator 100. For this, the driver unit 30 (i.e. an output port of the driver unit 30) is electrically connected to the first and the second electrical line 11, 12 via a flexible coplanar line 50. The flexible coplanar line 50 comprises electrical lines 51, 52 arranged on a flexible, foil-like substrate 53 (e.g. formed from a polymer such as polyimide).

The distance between the two (parallel) electrical lines 51, 52 is chosen to be small enough that the electrical lines 51, 52 from an electrical waveguide for conveying a high frequency electrical wave. For example, the distance between the electrical lines 51, 52 is smaller than 100 μm or smaller than 50 μm.

First endings of the electrical lines 51, 52 of the flexible coplanar line 50 are connected to an output port of the driver unit, whereas second endings of the electrical lines 51, 52 are connected to endings of the first and second electrical line 11, 12 of the modulator 100. Since the flexible coplanar strip 50 provides an electrical waveguide, its impedance can be better matched with the impedance of the driver unit 30 and the electrode arrangement 1 of the modulator such that the high frequency performance of the modulator can be improved. Due to its waveguide properties, in turn, the flexible coplanar strip 50 in contrast to bonding wires does not have to be very short such that a good thermal separation between the driver unit 30 (that may warm up during operation) and the modulator 100 can be realized. For example, the driver unit 30 is arranged in a distance of at least 1 mm from the modulator 100.

It is noted again that the monolithic integration of the terminating resistors, the metal structure 31 and/or the additional capacitor 40 with the electrical lines 11, 12 is only optional. For example, at least one of the group of the terminating resistor 21, 22, the metal structure 31 and/or the additional capacitor 40 is formed as a separate part, e.g. arranged on another substrate (e.g. a ceramic substrate) than the electrical lines 11, 12 and e.g. bonded to the electrical lines 11, 12 via bonding wires.

REFERENCE SIGNS

1 electrode arrangement
3 metal layer
10 first region
11, 12 electrical line
20 second region
21, 22 terminating resistor
23 end contact
30 driver unit
31 metal structure
31a, 31b capacitor
40 further capacitor
41, 42 transistor
50 flexible coplanar strip line
51, 52 electrical line
53 substrate
100 modulator
111, 121 air bridge
112, 122 optical waveguide
113, 123 waveguide electrode
114, 124 capacitive segment
200 modulator device
311 base portion
312 longitudinal portion
313, 314, 316 metal layer
317, 318 dielectric layer
401, 402 collector

The invention claimed is:

1. An electrical line arrangement, comprising
a first and a second electrical line forming a coplanar strip line; and
at least one terminating resistor terminating the first and the second electrical line, wherein in a first region of the electrical line arrangement the first and the second electrical line extend in a first distance from one another and wherein in a second region of the electrical line arrangement the first and the second electrical line extend in a second distance from one another that is larger than the first distance such that a gap between the first electrical line and the second electrical line is larger in the second region than in the first region, wherein the terminating resistor is physically arranged at a position between the first and the second electrical line that is in the gap at the second region of the electrical line arrangement, and wherein at least one electrically conductive structure is arranged between the first and the second electrical line at least partially in the second region of the electrical line arrangement for adapting the impedance of the coplanar strip line.

2. The electrical line arrangement as claimed in claim 1, wherein the conductive structure is arranged and configured in such a way that it at least essentially matches the impedance of the first region to the impedance of the second region of the electrical line arrangement.

3. The electrical line arrangement as claimed in claim 1, wherein a single terminating resistor is arranged between the first and a second electrical line in the second region of the electrical line arrangement.

4. The electrical line arrangement as claimed in claim 1, wherein the conductive structure is electrically isolated from the first and the second electrical line.

5. The electrical line arrangement as claimed in claim 1, wherein two terminating resistors are arranged between the first and a second electrical line in the second region of the electrical line arrangement, wherein the two terminating resistors are connected to one another via an end contact.

6. The electrical line arrangement as claimed in claim 5, wherein the end contact is connected to the conductive structure.

7. The electrical line arrangement as claimed in claim 5, wherein the conductive structure is part of a capacitive structure which capacitively couples, but galvanically separates the two terminating resistors.

8. The electrical line arrangement as claimed in claim 7, wherein the conductive structure comprises at least two electrically conductive layers separated by a dielectric layer.

9. The electrical line arrangement as claimed in claim 8, wherein a first one of the conductive layers is connected to a first one of the terminating resistors and a second one of the conductive layers is connected to a second one of the terminating resistors.

10. The electrical line arrangement as claimed in claim 9, wherein the conductive structure comprises three electrically conductive layers and at least one dielectric layer, wherein a first and a third one of the conductive layers are separated by the dielectric layer and the third conductive layer and a second one of the conductive layers are separated by the dielectric layer, and wherein the first conductive layer is connected to a first one of the terminating resistors, the second conductive layer is connected to a second one of the terminating resistors and the third conductive layer is grounded.

11. The electrical line arrangement as claimed in claim 5, wherein the terminating resistors have the same resistance.

12. The electrical line arrangement as claimed in claim 1, wherein the first and the second electrical line are capacitively coupled to one another.

13. The electrical line arrangement as claimed in claim 1, wherein the first and the second electrical line are formed as geometrically symmetric structures.

14. The electrical line arrangement as claimed in claim 1, further comprising a driver unit configured for supplying a differential voltage signal to the coplanar strip line.

15. The electrical line arrangement as claimed in claim 1, wherein the terminating resistor is arranged on the same substrate as the first and the second electrical line of the electrical line arrangement.

16. The electrical line arrangement as claimed in claim 1, wherein the distance between the first and the second electrical line in the first region of the electrical line arrangement is at least essentially constant.

17. An electro-optical modulator, comprising at least one optical waveguide and an electrical line arrangement as claimed in claim 1, wherein the electrical line arrangement forms an electrode arrangement for applying a voltage across the optical waveguide.

18. The electro-optical modulator as claimed in claim 17, wherein the electrical line arrangement comprises a driver unit for supplying a voltage to the electrode arrangement, wherein the driver unit is operated in open collector mode, in open collector mode with back termination, in open drain mode or in open drain mode with back termination.

19. The electro-optical modulator as claimed in claim 17, wherein the modulator is a travelling wave modulator, the electrical line arrangement forming a travelling wave electrode arrangement.

* * * * *